US009404561B2

(12) United States Patent
 Lobo (10) Patent No.: US 9,404,561 B2
(45) Date of Patent: Aug. 2, 2016

(54) ROTARY-TO-LINEAR MOTION ACTUATOR HAVING A HELICAL BEVEL GEAR AND METHOD OF USE THEREOF

(71) Applicant: Valve Systems International LLC, Tulsa, OK (US)

(72) Inventor: Mark A. Lobo, Tulsa, OK (US)

(73) Assignee: Valve Systems International LLC, Tulsa, OK (US)

( * ) Notice: Subject to any disclaimer, the term of this patent is extended or adjusted under 35 U.S.C. 154(b) by 0 days.

(21) Appl. No.: 14/822,886

(22) Filed: Aug. 10, 2015

(65) Prior Publication Data

US 2015/0345657 A1    Dec. 3, 2015

Related U.S. Application Data

(63) Continuation-in-part of application No. 13/895,938, filed on May 16, 2013, now Pat. No. 9,103,421.

(51) Int. Cl.

| F16K 31/53 | (2006.01) |
|---|---|
| F16H 25/20 | (2006.01) |
| F16K 1/12 | (2006.01) |
| F16K 1/34 | (2006.01) |

(Continued)

(52) U.S. Cl.
CPC .............. *F16H 25/20* (2013.01); *F16H 37/124* (2013.01); *F16K 1/123* (2013.01); *F16K 1/34* (2013.01); *F16K 31/53* (2013.01); *F16H 1/14* (2013.01); *F16H 2025/2046* (2013.01); *F16H 2025/2084* (2013.01); *F16H 2025/2093* (2013.01); *Y10T 74/18096* (2015.01)

(58) Field of Classification Search
CPC ... F16H 25/20; F16H 1/14; F16H 2020/2064; F16H 2020/2084; F16H 2020/2093; Y10T 74/18096; F16K 31/00; F16K 31/44; F16K 31/53; F16K 1/123; F16K 1/34
USPC ................. 251/214, 264, 266–368, 373–374, 251/248–349.5, 350.5, 229; 137/219
See application file for complete search history.

(56) References Cited

U.S. PATENT DOCUMENTS

| 1,441,784 A | 1/1923 | Clayton |
| 2,513,650 A | 6/1944 | Johnston |
| 2,463,809 A | 10/1944 | Sacchini |

(Continued)

FOREIGN PATENT DOCUMENTS

| JP | 5263951 A | 10/1993 |
| KR | 100645444 | 11/2006 |

*Primary Examiner* — Marina Tietjen
(74) *Attorney, Agent, or Firm* — Head, Johnson & Kachigian, P.C.

(57) ABSTRACT

A rotary-to-linear motion actuator having helical bevel gear and methods of use thereof are described. The actuator may be utilized with an apparatus for managing a fluid flow passage between one or more input ports and output ports. A pinion gear engages, and during operation turns, a bevel ring gear arranged on a helical path along an external periphery of a sleeve retaining a seat, which forms a fixed orifice. The teeth of the bevel gear are arranged on the helical path at the same pitch as external threads on the sleeve, which in turn, engage internal threads in a thrust tube. The trust tube is engaged with a thrust tube jam nut that locks the thrust tube into position within the valve body. The area of the flow passage is changed by movement of the fixed seat orifice axially with respect to a contoured plug assembly. The threads of the sleeve and the thrust tube resist axial load imparted by the pressure drop across at the fixed orifice.

20 Claims, 8 Drawing Sheets

(51) Int. Cl.
*F16H 37/12* (2006.01)
*F16H 1/14* (2006.01)

(56) References Cited

U.S. PATENT DOCUMENTS

| | | | |
|---|---|---|---|
| 2,536,836 A | 5/1947 | Bowling | |
| 2,742,254 A | 4/1956 | Banker et al. | |
| 2,745,294 A | 5/1956 | Kron | |
| 2,760,753 A | 8/1956 | Guarnaschelli | |
| 2,878,827 A | 3/1959 | Johnson et al. | |
| 2,963,260 A | 12/1960 | Siravo | |
| 3,227,174 A | 1/1966 | Yost | |
| 3,596,679 A | 8/1971 | Sudgen, Jr. | |
| 3,601,364 A | 8/1971 | Scaramucci | |
| 3,714,969 A | 2/1973 | Hanning | |
| 3,784,156 A | 1/1974 | Paetzel et al. | |
| 4,565,210 A | 1/1986 | Heine et al. | |
| 4,679,588 A | 7/1987 | Raab et al. | |
| 4,759,224 A | 7/1988 | Charbonneau et al. | |
| 4,994,001 A | 2/1991 | Wilkinson et al. | |
| 6,079,442 A | 6/2000 | Raymond, Jr. et al. | |
| 6,443,422 B1 | 9/2002 | Gluf, Jr. | |
| 6,471,184 B1 | 10/2002 | McIntosh | |
| 6,772,783 B2 | 8/2004 | Etheridge | |
| 2005/0211941 A1 | 9/2005 | LaVergne et al. | |
| 2011/0193001 A1 | 8/2011 | Farner | |

ROTARY-TO-LINEAR MOTION ACTUATOR HAVING A HELICAL BEVEL GEAR AND METHOD OF USE THEREOF

CROSS REFERENCE TO RELATED APPLICATIONS

This application claims priority to and is a continuation-in-part of U.S. patent application Ser. No. 13/895,938, filed May 16, 2013, now U.S. Pat. No. 9,103,421, issued Aug. 11, 2015, which is incorporated herein by referenced in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates generally to a rotary-to-linear motion actuator having a helical bevel gear and methods of use thereof, and more particularly to a fluid flow apparatus having a helical bevel gear for controlling the flow of a fluid by means of changing the area of a flow passage.

2. Description of the Related Art

When a fluid passes through a restricted passage, it gains speed in the area where the cross section is reduced. Since the energy, according to Bernouilli's law, is conserved, the rise in kinetic energy generates a drop in the pressure energy. The later then rises again when the flow passage cross section area rises again, thereby reducing the speed of the fluid.

The use of a purely mechanical apparatus in which a plug seals against a seat is very widely known, and can be used either to close off the flow altogether or adjust the flow of a fluid by movement of the plug away from the seat. Such a valve is not entirely suitable for use in controlling flows of potentially abrasive fluids, for example the liquids emerging from an oil well that may contain sand particles, as the particulate material will cause abrasion of the valve surfaces especially when the valve is almost closed. In addition, the pressure can locally drop by a large amount and reach values that are lower than the vaporization pressure of this liquid when the flow passage is restricted. When this happens, liquid can vaporize causing small gas bubbles to build up. The rise in pressure due to velocity decrease or contact with a surface then leads to an implosion of these bubbles, which is a highly energetic phenomenon in terms of pressure and temperature which can lead to the surrounding solid surface matter being abraded or torn apart. According to the extent of the cavitation phenomenon, the erosion taking place on the downstream surface of the body can be very quick and the destruction of the apparatus can take only a short amount of time. Consequently, when the apparatus is intended to be used in an application characterized by a large pressure difference, it is necessary to provide a valve that is adapted to withstand such a large pressure difference.

It is desirable to provide an actuator that converts rotary motion to linear motion by means of a bevel gear with teeth arranged on a helix of the same pitch as load bearing threads.

It is therefore further desirable to provide a fluid flow apparatus having a helical bevel gear for controlling the flow of a fluid by means of changing the area of the flow passage.

It is still further desirable to provide a fluid flow apparatus having a helical bevel gear that minimizes the disturbance of the fluid passing through the apparatus, thereby reducing the erosive effect on interior surfaces that force the fluid to change direction.

It is yet further desirable to provide a fluid flow apparatus having a helical bevel gear where the pressure drop through the flow passage is suitably distributed within the apparatus, so as to efficiently protect the apparatus against damage due to cavitation.

It is still yet further desirable to provide a fluid flow apparatus having a variable restriction orifice that is affected by rotating a stem in order to actuate a helical bevel gear to linearly move a contoured plug assembly in a direction normal to the plane of the orifice.

Other advantages and features will be apparent from the following description, and from the claims.

SUMMARY OF THE INVENTION

In general, the invention relates to a fluid flow apparatus having a flow passage between one or more input ports and output ports. The fluid flow apparatus includes a body having a stem receptacle for receipt of a stem assembly. The stem assembly has a pinion gear. A thrust tube is engaged with a thrust tube jam nut, and the thrust tube has an internally threaded section. The apparatus also has a rotatable sleeve with an externally threaded section engaged with the internally threaded section of the thrust tube. The sleeve has an external helical bevel ring gear arranged along a helical path about the sleeve, and the external helical bevel ring gear is engaged with the pinion gear of the stem assembly. The helical bevel ring gear may be positioned upstream of the pinon gear of the stem assembly in order to improve efficiency of the fluid flow apparatus. A plug assembly has a contoured plug positioned within the flow passage, and an annular seat, which is retained by the sleeve, has an orifice. The plug is positioned upstream of the orifice of the seat, and the orifice of the seat is linearly movable toward the plug assembly.

The stem assembly of the apparatus may include a stem seal gland threadedly engaged with the body and secured to the body by a gland nut, and circular sealing assemblies can be positioned intermediate of annular sealing shoulders of the body and the stem seal gland. The body of the fluid flow apparatus can include a gear cavity capable of being pressurized to balance forces on the sleeve from pressurized process fluid in the flow passage. In addition, the body may have opposing generally planar axial or open ends, with at least one of the open ends being secured to an intake end fitting. The intake end fitting may be sealed with respect to the body by an annular seal or seal assembly positioned within a circular seal groove. Moreover, an externally threaded section of the plug assembly can engage an internally threaded section of the intake end fitting. The intake end fitting and the plug assembly can be sealed by an annular seal or seal assembly carried within a circular seal groove.

Further, the body may include a thrust tube relief having internal threads engaged with an externally threaded section of the thrust tube. The valve body and the thrust tube can be sealed by an annular seal or seal assembly carried within a circular seal groove. The thrust tube is adjustable and locked into place within the body using the thrust tube jam nut. The body can also include a thrust tube jam nut relief engaged with the thrust tube jam nut in order to lock the thrust tube into position within the body. An internal sealing surface of the thrust tube may be sealed with respect to an external sealing surface of the sleeve by an annular seal or seal assembly carried within a circular seal groove.

Additionally, the plug assembly can include an extended plug having a contoured end and a radially projecting finned end. The external threads of the sleeve and the internal threads of the thrust tube are load-carrying and resist the axial load imparted by the pressure drop at the orifice of the seat. The sleeve can include an internal seat relief which receives the annular seat, and the seat may be sealed with respect to the seat relief by a circular sealing assembly received within a circular seal groove of the sleeve.

DETAILED DESCRIPTION OF THE INVENTION

The device and methods discussed herein are merely illustrative of specific manners in which to make and use this invention and are not to be interpreted as limiting in scope.

While the invention has been described with a certain degree of particularity, it is to be noted that many modifications may be made in the details of the construction and the arrangement of the elements and components of the devices and/or in the sequences and steps of the methods without departing from the scope of this disclosure. It is understood that the devices and methods are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Figure 1:
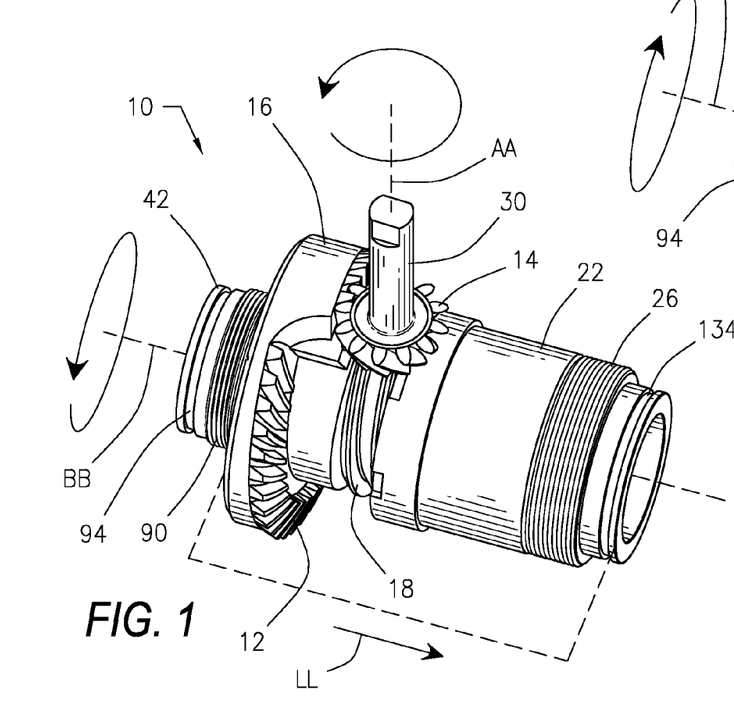
FIG. 1 is a perspective view of an example of a rotary-to-linear motion actuator having helical bevel gear, where the actuator is in an open position, in accordance with an illustrative embodiment of the invention disclosed herein.
Figure 2:
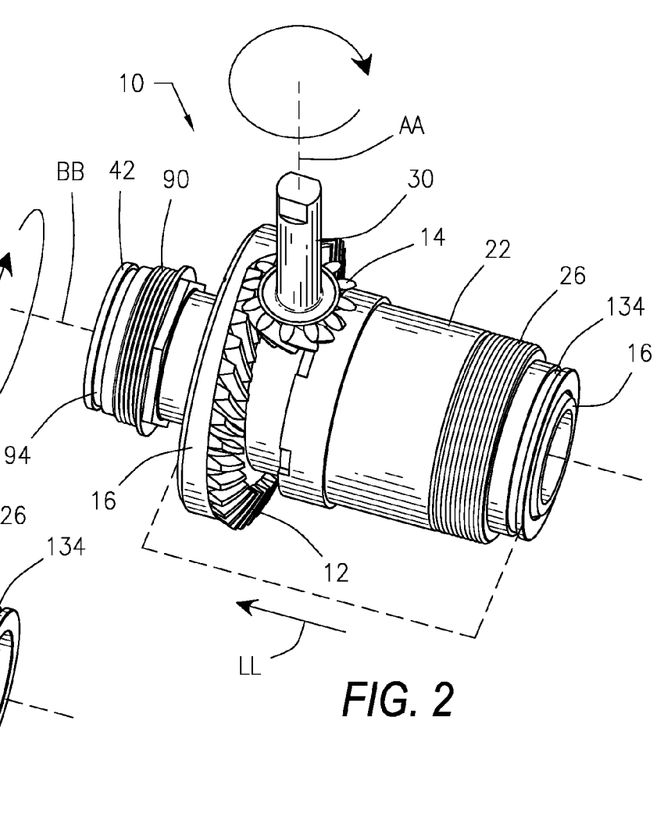
FIG. 2 is another perspective view of the actuator shown in FIG. 1, where the actuator is in a closed position.
Figure 3:
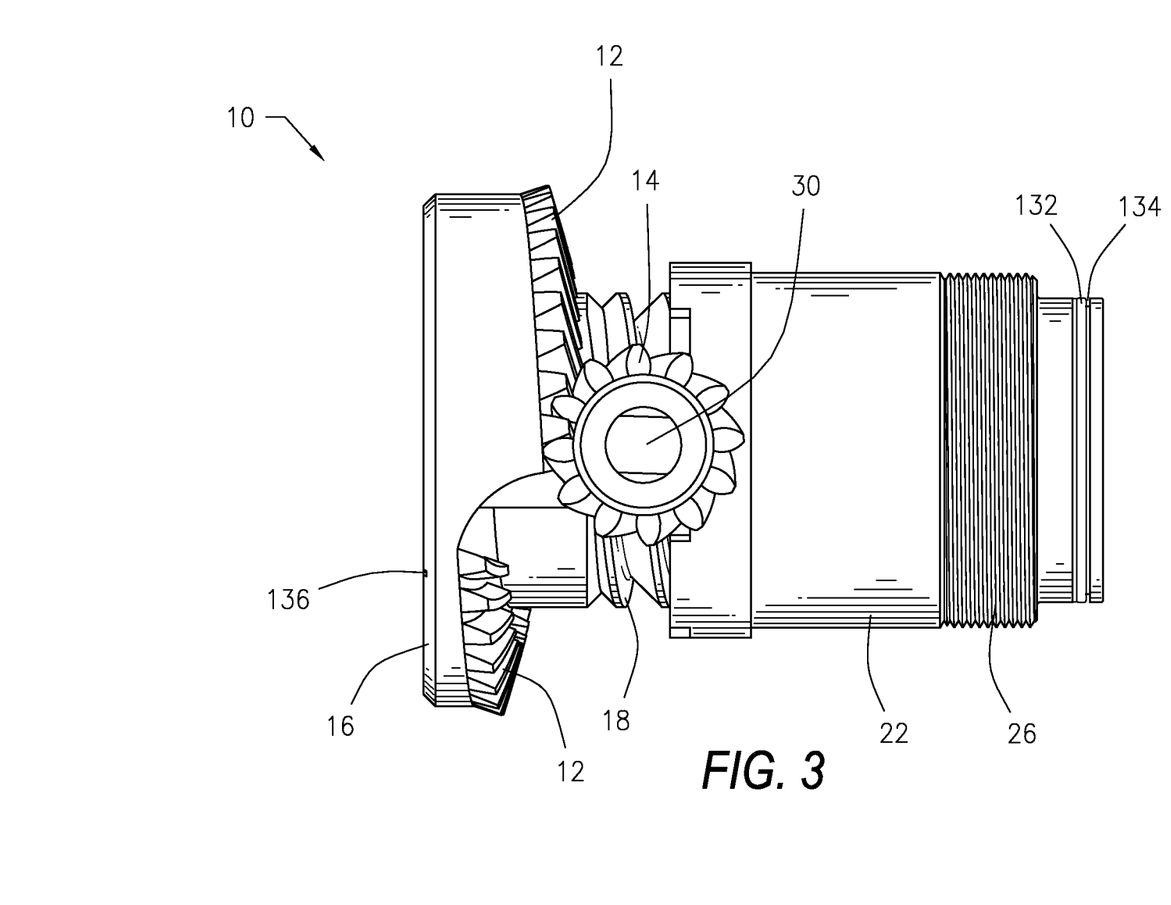
FIG. 3 is a top plan view of the actuator shown in FIG. 1.
Figure 4:
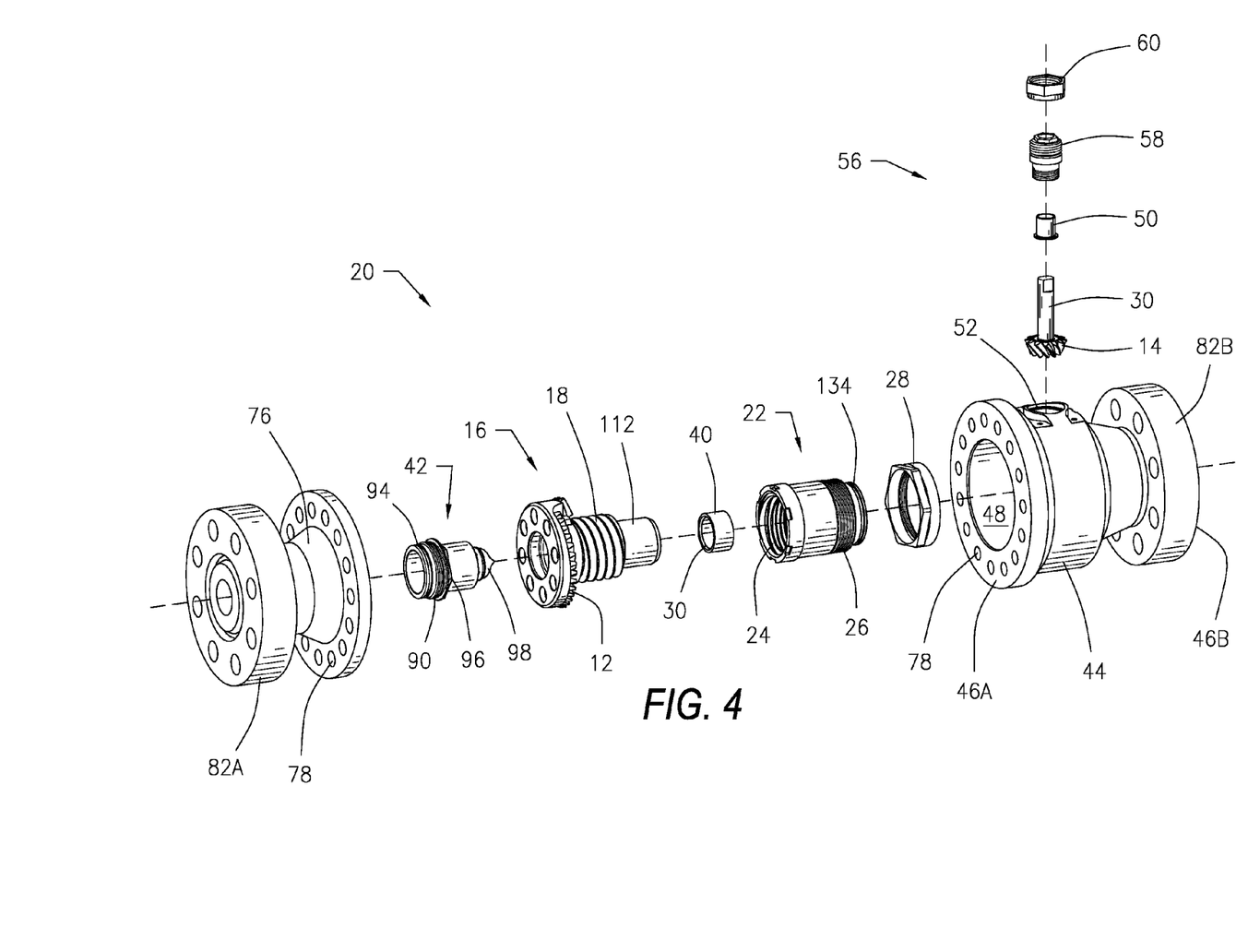
FIG. 4 is an exploded view of an example of a fluid flow apparatus in accordance with an illustrative embodiment of the invention disclosed herein.
Figure 5:
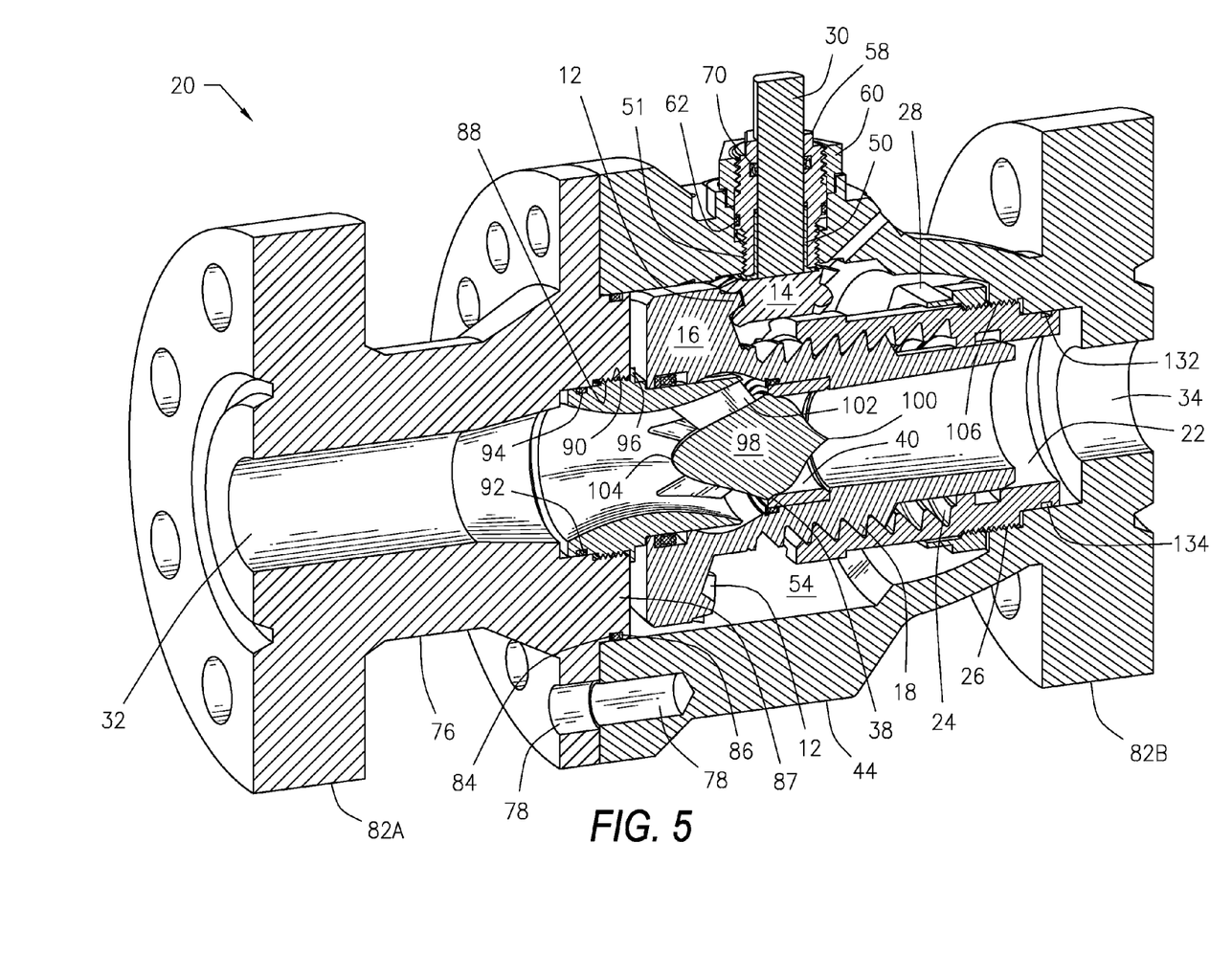
FIG. 5 is a perspective, cross-sectional view of the exploded apparatus shown in FIG. 4.
Figure 6:
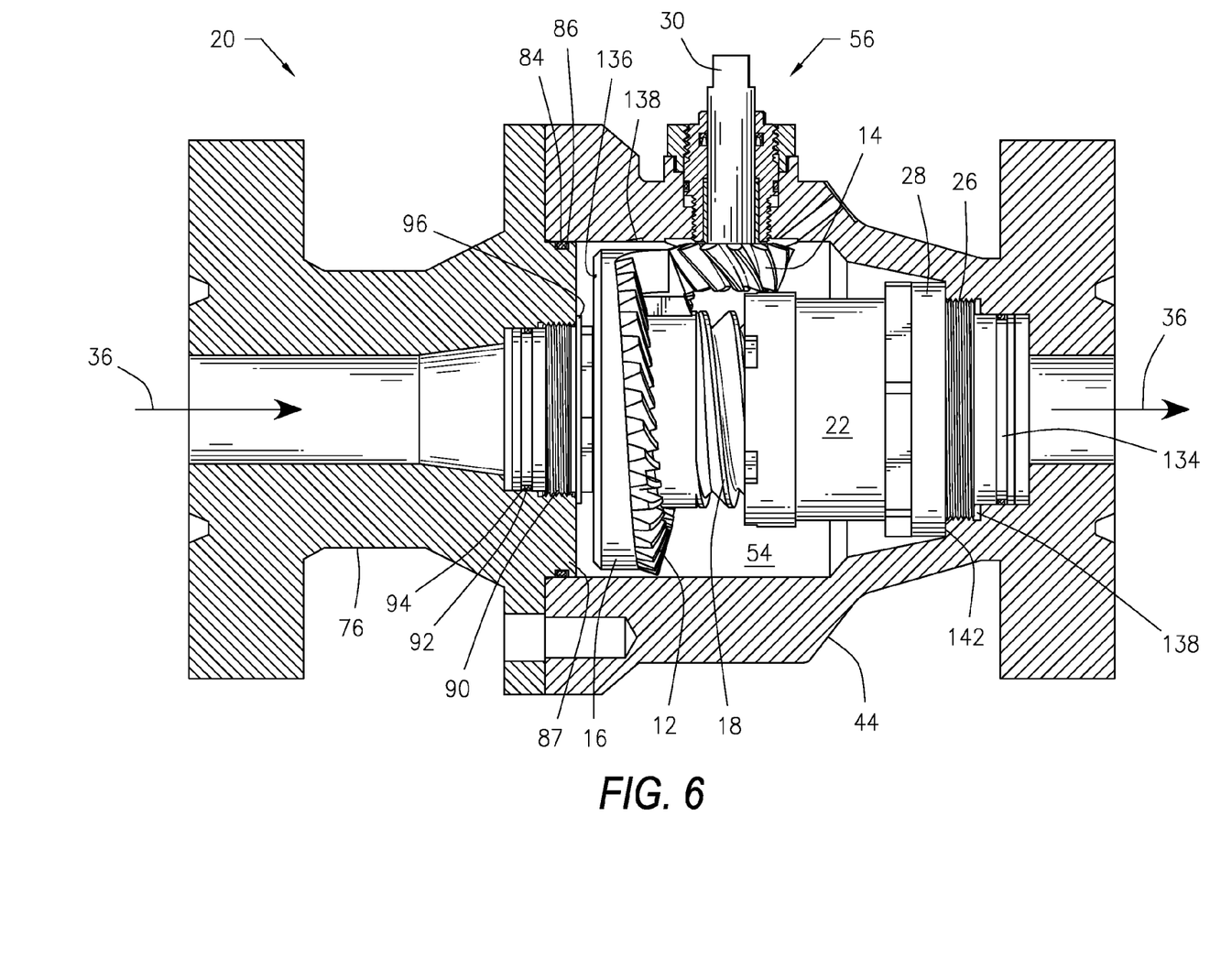
FIG. 6 is a side, partial cross-sectional view of the apparatus shown in FIG. 4.
Figure 7:
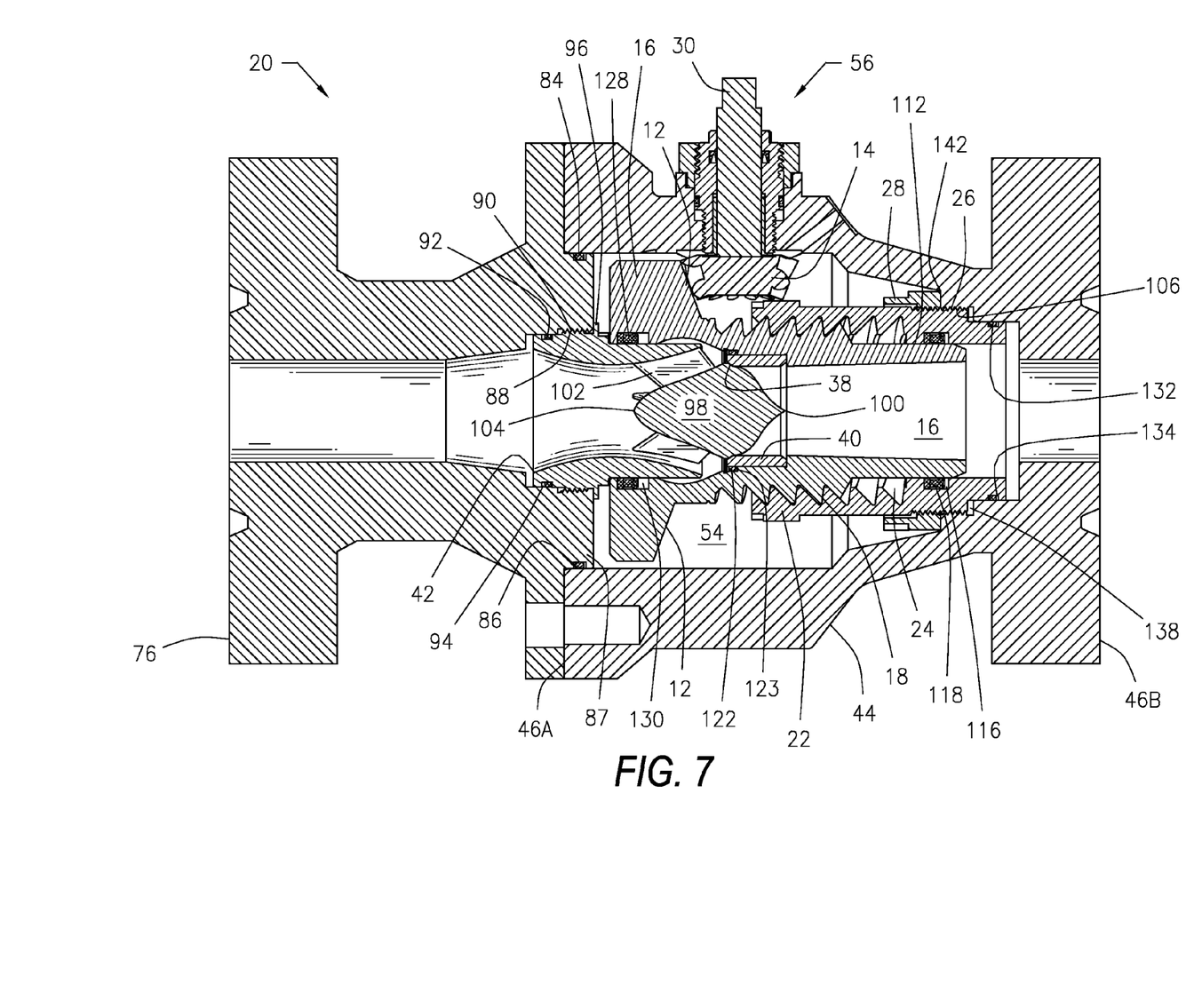
FIG. 7 is a cross-sectional view of the apparatus shown in FIG. 5, where the apparatus is in a closed position.
Figure 8:
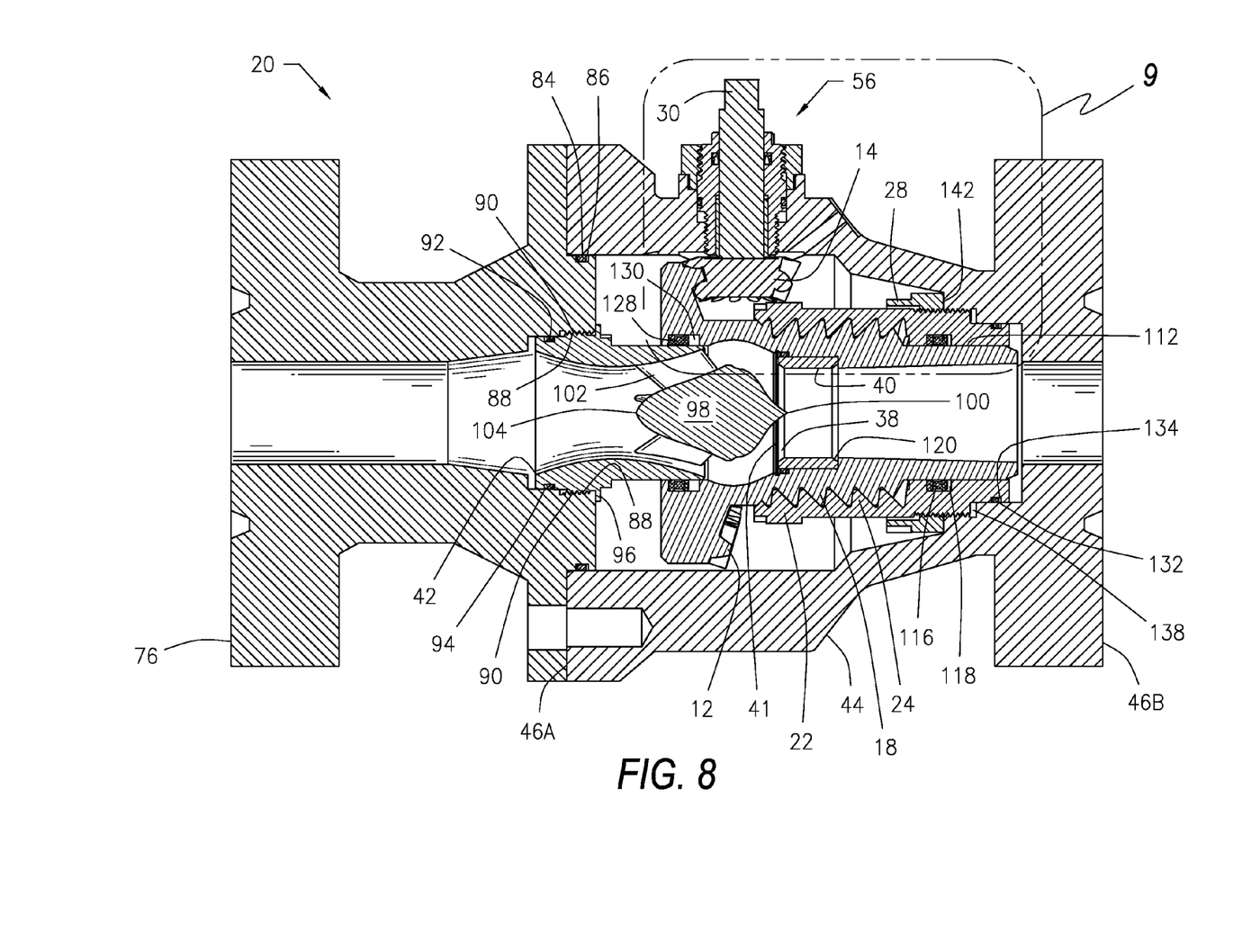
FIG. 8 is a cross-sectional view of the apparatus shown in FIG. 5, where the apparatus is in an open position.
Figure 9:
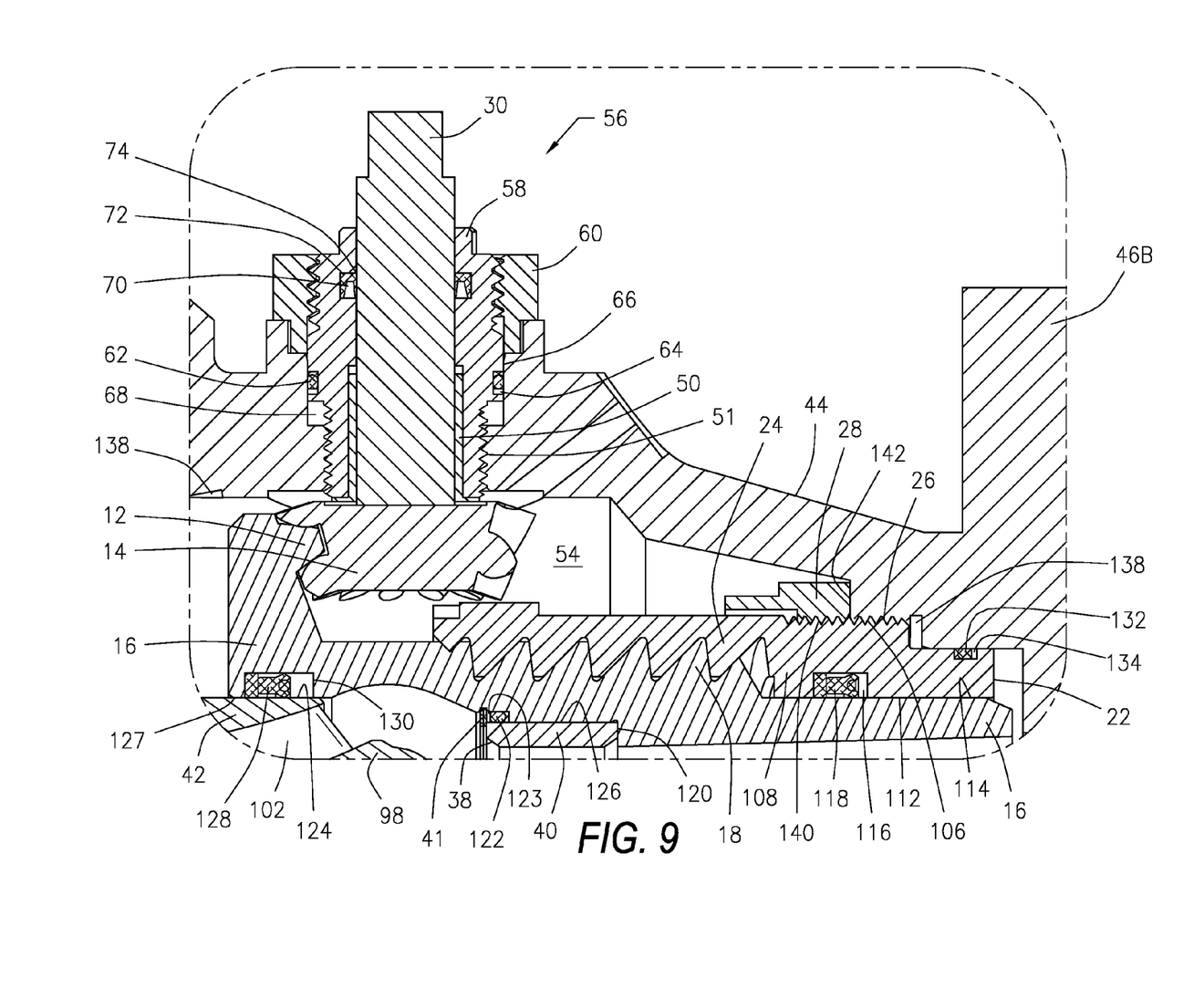
FIG. 9 is a cross-section view of area 9 of the apparatus as shown in FIG. 8.

Referring to the figures of the drawings, wherein like numerals of reference designate like elements throughout the several views, and initially to FIGS. 1 through 3 whereby a generalized arrangement for the inventive rotary-to-linear motion actuator 10 having a helical bevel gear 12 is depicted. A stemmed pinion gear 14 engages the helical bevel ring gear 12 affixed to a rotatable sleeve 16 having external threads 18. The pinion gear 14 is shown on an downstream side of the bevel gear 12 in order to improve the operating efficiency of the actuator 10. The teeth of the bevel gear 12 are arranged along a helical path about the circumference of the sleeve 16, and have the same pitch as external threads 18 on the sleeve 16. Additionally, the helical bevel ring gear 12 may include straight bevel gear teeth or as illustrated with spiral bevel gear teeth in order to increase the strength thereof. The sleeve 16 is received within an adjustable thrust tube 22, and external threads 18 of sleeve 16 are engaged with internal threads 24 of the thrust tube 22. The external threads 18 of the sleeve 16 and the internal threads 24 of the thrust tube 22 are exemplified as buttress threads to increase the power transmission capabilities.

While the actuator 10 is shown as allowing for one full rotation, the helical path of the bevel gear 12 may have a pitch that would accommodate the diameter of the pinion gear 14 plus the thickness of the helical bevel gear 12 so that the gear 12 could rotate more than one full turn. As such, the axial travel distance of the actuator 10 is governed by the length of the bevel gear 12 and the external threads 18 on the sleeve 16. The actuator 10 is shown in an closed position in FIG. 1, and as the pinion gear 14 rotates in a first direction AA, the pinion gear 14 engages the bevel gear 12 and traverses the helical path, thereby causing the sleeve 16 to rotate about axis BB in the direction of the arrow and move linearly along path LL. The actuator 10 is shown in a open position in FIG. 2, and as the pinion gear 14 rotates in a second direction about axis AA, the pinion gear 14 moves back along the helical path and the sleeve 16 rotates in a second direction about axis BB and moves linearly back along path LL to the closed position.

The helical bevel ring gear 12 could be applied to any linear motion actuator, and for purposes of exemplification rather than limitation herein is exemplified with a fluid flow apparatus 20; however, the actuator 10 should not be so limited as the invention can be utilized in other embodiments. The fluid flow apparatus 20 can be a control valve or submersible pump pressure regulator for controlling the flow of a fluid by means of changing the area of a flow passage. An electric, rotary actuator (not shown) may be attached with a mounting bracket to the fluid flow apparatus 20. The mounting bracket may be equipped with a coupler (not shown) to join an output shaft of the rotary actuator to a stem 30 of the apparatus 20.

Turning now to FIGS. 3 through 10, the apparatus 20 manages fluid flow between one or more input ports 32 and output ports 34 using the helical bevel gear 12 to change the area of a flow passage 36 by moving an orifice 38 of a seat 40 axially with respect to a fixed, contoured plug assembly 42. As illustrated, the apparatus 20 includes a valve body 44 having opposing generally planar axial or open ends 46. The valve body 44 defines an internal valve chamber 48 and defines a first threaded bore 51 forming an actuating stem receptacle 52, which is in communication with a gear cavity 54. Lubricant within the gear cavity 54 of the valve body 44 may be pressurized to balance the force on the sleeve 16 from the process fluid under pressure to aid in closing the apparatus 20. To obtain sealing between the valve body 44 and the actuating stem 30, it may be appropriate to utilize a packing or stem sealing assembly 56. A stem seal gland 58 is threaded into the stem bore 51 in conjunction with a stem bearing 50, and a gland nut 60 secures the gland 58 to the valve body 44. The stem sealing assembly 56 allows for adjustment of the pinion gear 14 engagement with the bevel gear 12. The apparatus 20 is also provided with circular sealing elements or seal assemblies 62 carried within circular seal grooves 64 of the stem seal gland 58, which establish sealing engagement with an external cylindrical sealing surface 66 of the stem seal gland 58 and an internal cylindrical sealing surface 68 of the stem receptacle 52 in the valve body 44. An additional sealing element 70 may also be supported within a circular seal groove 72 of the stem seal gland 58 for sealing engagement with a cylindrical sealing surface 74 of the actuating stem 30.

The valve body 44 defines end openings 46 and is a two-piece assembly having an intake hub end fitting 76 secured thereto. The hub end fitting 76 and the valve body 44 include a plurality of axially aligned bolt openings 78 which receive bolts or threaded studs to secure the end fitting 76 to upstream or intake end 46A of the valve body 44. A downstream or output end 46B and the intake end 46A of the valve body 44 may also include a flange 82 with bolt openings that axially align with bolt openings of a mating connection (not shown); however, the end fitting 76 and output end 46B of the valve body 44 are not so limited and can be threaded or otherwise configured to match that of the mating connection. The hub end fitting 76 is sealed with respect to the valve body 44 by an annular seal or seal assembly 84. The seal assembly 84 can be carried within a circular seal groove 86 defined in an annular shoulder 87 of the end fitting 76. The annular seal or seal assembly 84 may be elastomer or polymer seals that provide sealing within a normal operating temperature range.

The end fitting 76 may include an internally threaded section 88 that receives an externally threaded section 90 of the plug assembly 42. In addition to the threaded engagement, the end fitting 76 and the plug assembly 42 are sealed by annular seals or seal assemblies 92. The seals 92 can be carried within a circular seal groove 94 near an end of the plug assembly 42. The plug assembly 42 may define an external, circular stop shoulder 96 that may provide a metal-to-metal engagement with the annular shoulder 87 by threading it into the end fitting 76 to its fully seated position. A plug 98 is fixed within the plug assembly 42 along the flow passage 36, and is contoured on a downstream end 100 and has a plurality of radially projection support fins 102 on a upstream end 104. The extended plug 98 of the plug assembly 42 of the apparatus 20 and the seat 40 seal on the downstream end 100 of the plug 98 contour in order to close the flow passage 36 of the apparatus 20.

The output end 46B of the valve body 44 includes a thrust tube relief 138 having internal threads 106 that engage the external threads 26 on the thrust tube 22. Similar to the end fitting 76 and the plug assembly 42, the output end 46B of the valve body 44 and the thrust tube 22 are sealed by annular seals or seal assemblies 132 carried within a circular seal groove 134 near an end of the thrust tube 22. Moreover, the thrust tube 22 is axially adjustable and fixed in place within the valve body 44 with a thrust tube jam nut 28. The external threads 26 of the thrust tube 22 engage internal threads 140 of the thrust tube jam nut 28, and the output end 46B of the valve body 44 includes a thrust tube jam nut relief 142 that engages the thrust tube jam nut 28 in order to lock the thrust tube 22 into position.

The thrust tube 22 is engaged with the sleeve 16, which in turn is engaged with the seat 40. The external threads 18 cause the sleeve 16 to axially move along the flow passage 36 through the thrust tube 22 as the sleeve 16 rotates. The external threads 18 of the sleeve 16 and the internal threads 24 of the thrust tube 22 are load-carrying and resist the axial load imparted by the pressure drop at the fixed orifice 38 of the seat 40. The internal threads 24 of the thrust tube 22 terminate in an annular shoulder 108 and engage with the external threads 18 of the sleeve 16. Additionally, an internal sealing surface 112 of the thrust tube 22 may be sealed with respect to an external sealing surface 114 of the sleeve 16. A circular seal groove 116 on the internal sealing surface 112 of the thrust tube 22 may receive an annular sealing assembly 118. The sealing assembly 118 may be a bi-direction dynamic seal that isolates the processing fluid from lubricant within the gear cavity 54 of the valve body 44.

The seat 40 is configured to be positioned internally of the sleeve 16 along the flow passage 36 and secured by a retainer 41. The sleeve 16 defines stepped internal seat reliefs 120 within which receive the annular seat 40. The seat 40 is sealed with respect to the seat reliefs 120 by a circular sealing assembly 122, which may be received within a circular seal groove 123 of the sleeve 16. The circular sealing assembly 122 establishes sealing within an external sealing surface 126 which is defined by the outer periphery of the seat 40. The circular sealing assemblies 122 can be constructed from elastomer and polymer materials capable of accomplishing effective sealing at normal operating temperatures and at all pressure ranges.

In addition, an internal sealing surface 127 of the sleeve 16 may be sealed with respect to an external sealing surface 124 of the plug assembly 42 by an annular sealing assembly 128. The annular sealing assembly 128 may be a bi-directional dynamic seal positioned within a circular seal groove 130 on the internal sealing surface 127 of the sleeve 16. The dynamic seal 128 isolates fluid in the flow passage 36 from lubricant in the gear cavity 54 of the valve body 44.

As illustrated, the plug assembly 42, the seat 40, the thrust tube 22 and the sleeve 16 are axially aligned and co-axially spaced. The seat 40, the thrust tube 22, the thrust tube jam nut 28 and the sleeve 16 are also concentrically arranged. Moreover, the plug 98 is positioned upstream of the orifice 38 edge of the seat 40 to permit the helical bevel gear 12 induced axial load on the sleeve 16 to aid during closure of the flow passage 36.

The valve body 44 and hub end fitting 76 may be fabricated from forged or wrought material complying with industry standards for the intended usage. The plug assembly 42, the thrust tube 22, the thrust tube jam nut 28, the sleeve 16 and/or the stem 30 can be fabricated from investment cast precipitation-hardening corrosion-resistant steel, and erosion prone surfaces near the annulus between the downstream surface of the plug 98 and the orifice 38 of the seat 40 can be lined with tungsten carbide. Erosion and corrosion-resistant materials may be applied as required to accompany application severity. In addition to the seals and seal assemblies discussed herein, the invention may utilize additional wear rings, gaskets and/or sleeves can be applied to the contoured end 100 of the plug 98, the surfaces of the seat 40 along the flow passage 36 and/or other areas downstream of the seat 40. The foregoing materials are merely examples that may be utilized in constructing the apparatus 20 and other materials may be employed to suit the particular usage of the apparatus 20.

In order to assemble the apparatus 20, a timing mark 136 on the sleeve 16 must be aligned with a timing mark 138 along the center line inside the valve body 44. The sleeve 16 is fully threaded into the thrust tube 22, and the thrust tube jam nut 22 is fully threaded on the thrust tube 22. Dimension T from the face of the sleeve 16 to the face of the thrust tube 22 is recorded. The sleeve, thrust tube and jam nut assembly are then fully threaded into the valve body 44 until the thrust tube jam nut 28 contacts the thrust tube jam nut relief 142, and dimension A from the intake face 46A of the valve body 44 to the face of the sleeve 16 is recorded. The sleeve 16 and the thrust tube 22 are then rotated until the timing marks 136 and 138 are aligned, and with the timing marks 136 and 138 aligned, dimension S from the intake face 46A of the valve body 44 to the face of the sleeve 16 is recorded again. The sleeve 16 and the thrust tube 22 are then removed, and the stem 30 and the stem sealing assembly 56 are installed. Using Equations 1 through 3 below, the thrust tube 22 may then be reinstalled into the valve body 44 by threading the thrust tube 22 through the jam nut 28 until the face of the thrust tube 22 and the intake face 46A of the valve body 44 equal dimension C of Equation 3. The trust tube 22 may be installed to dimension C above with the aid of a thrust tube wrench (not shown), and in particular, the thrust tube jam nut 28 is secured with the thrust tube wrench while holding the thrust tube 22 in position with the thrust tube holder.

$$B = A - S - T \quad \text{(Equation 1)}$$

where A is equal to the distance from the intake face 46A of the valve body 44 to the face of the sleeve 16 when the sleeve, thrust tube and jam nut assembly are fully threaded into the valve body 44; S is equal to the distance from the intake face 46A of the valve body 44 to the face of the sleeve 16 when the apparatus 20 is in a full open position; and T is equal to the distance from the face of the sleeve 16 to the face of the thrust tube 22 when the sleeve 16 is fully threaded into the thrust tube 22.

$$\Theta = 2\pi \left( \frac{T-B}{Lt-Ls} \right) \quad \text{(Equation 2)}$$

where $L_t$ is equal to the thread pitch of the external threads 26 of the thrust tube 22; and $L_s$ is equal to the thread pitch of the external threads 18 of the sleeve 16.

$$C = \left( \frac{\Theta}{2\pi} \right)(L_s) + S + T \quad \text{(Equation 3)}$$

During operation, fluid passes through the annulus between the downstream surface of the plug 98 and the orifice 38 edge of the seat 40, and the annulus area changes with axial movement of the sleeve 16 within the thrust tube 22, thereby forming a variable restriction orifice 38. The area of the flow passage 36 is changed by movement of the seat orifice 38 axially with respect to the contoured plug 98. In particular, rotation of the valve stem 30 turns the pinion gear 14 that engages and turns the bevel ring gear 12 affixed to the sleeve 16 fixing the variable restriction orifice 38 of the seat 40. The teeth of the bevel ring gear 12 are arranged on a helical path of the same pitch as the external threads 18 on the sleeve 16, which engage with the internal threads 24 of the thrust tube 22, which has been adjusted and locked into place using the thrust tube jam nut 28. The threads 18 of the sleeve 16 and the threads 24 of the thrust tube 22 in conjunction with the engagement between the thrust tube jam nut 28 and the annular stop shoulder 142 of the valve body 44 resist axial load imparted by the pressure drop across the plug 98.

Whereas, the devices and methods have been described in relation to the drawings and claims, it should be understood that other and further modifications, apart from those shown or suggested herein, may be made within the scope of this invention.

What is claimed is:

1. A fluid flow apparatus having a flow passage between one or more input ports and output ports, said fluid flow apparatus comprising:
    a body having a stem receptacle for receipt of a stem assembly, said stem assembly comprising a pinion gear;
    a thrust tube engaged with a thrust tube jam nut, said thrust tube having an internally threaded section;
    a rotatable sleeve having an externally threaded section engaged with said internally threaded section of said thrust tube, said sleeve having an external helical bevel ring gear arranged along a helical path about said sleeve, said external helical bevel ring gear engaged with said pinion gear of said stem assembly;
    a plug assembly comprising a contoured plug positioned within said flow passage; and
    an annular seat having an orifice, said seat retained by said sleeve, wherein said orifice of said seat is linearly movable toward said plug assembly.

2. The apparatus of claim 1 wherein said stem assembly further comprises a stem seal gland threadedly engaged with said body and secured to said body by a gland nut.

3. The apparatus of claim 2 further comprising circular sealing assemblies positioned intermediate of annular sealing shoulders of said body and said stem seal gland.

4. The apparatus of claim 1 wherein said body further comprises a gear cavity capable of being pressurized to balance forces on said sleeve from pressurized process fluid in said flow passage.

5. The apparatus of claim 1 wherein said body further comprises opposing generally planar axial or open ends, and wherein at least one of said open ends is secured to an intake end fitting.

6. The apparatus of claim 5 wherein said intake end fitting is sealed with respect to said body by an annular seal or seal assembly positioned within a circular seal groove.

7. The apparatus of claim 5 wherein an externally threaded section of said plug assembly engages an internally threaded section of said intake end fitting.

8. The apparatus of claim 7 wherein said intake end fitting and said plug assembly are sealed by an annular seal or seal assembly carried within a circular seal groove.

9. The apparatus of Clam 1 wherein said body includes a thrust tube relief having internal threads engaged with an externally threaded section of said thrust tube.

10. The apparatus of claim 9 wherein said body and said thrust tube are sealed by an annular seal or seal assembly carried within a circular seal groove.

11. The apparatus of claim 1 wherein said thrust tube is adjustable and locked into place within the body using said thrust tube jam nut.

12. The apparatus of claim 11 wherein said body further comprises a thrust tube jam nut relief engaged with said thrust tube jam nut in order to lock said thrust tube into position within said body.

13. The apparatus of claim 1 further comprising an internal sealing surface of said thrust tube sealed with respect to an external sealing surface of said sleeve by an annular seal or seal assembly carried within a circular seal groove.

14. The apparatus of claim 1 wherein said plug assembly further comprises an extended plug having a contoured end and a radially projecting finned end.

15. The apparatus of claim 1 wherein said external threads of said sleeve and said internal threads of said thrust tube are load-carrying and resist the axial load imparted by the pressure drop at said orifice of said seat.

16. The apparatus of claim 1 wherein said sleeve further comprises an internal seat relief which receives said annular seat.

17. The apparatus of claim 16 wherein said seat is sealed with respect to said seat relief by a circular sealing assembly received within a circular seal groove of said sleeve.

18. The apparatus of claim 1 wherein said plug is positioned upstream of said orifice of said seat.

19. The apparatus of claim 1 wherein said sleeve and said body further comprise timing marks.

20. The apparatus of claim 1 wherein said helical bevel ring gear is positioned upstream of said pinon gear of said stem assembly.

\* \* \* \* \*